E. L. Pratt,
Provision Safe,
Nº 25,165. Patented Aug. 16, 1859.
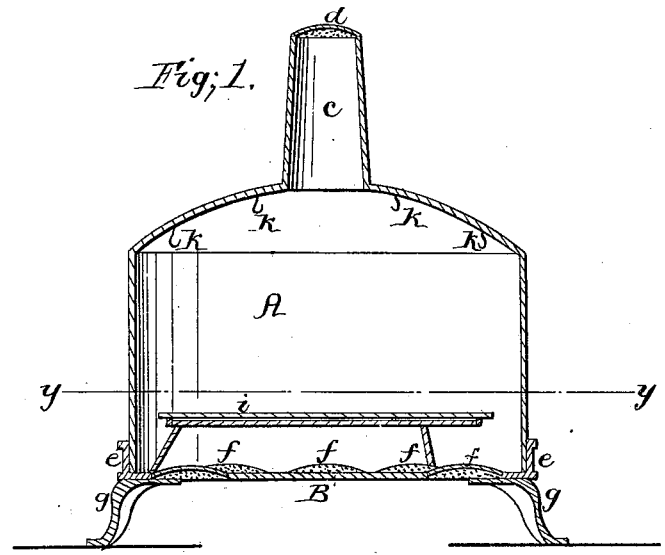
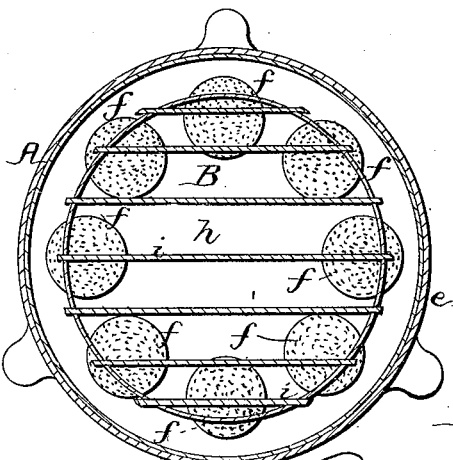
Witnesses;
Buy Morrison
R. T. Shattuck.
Inventor;
E. L. Pratt

UNITED STATES PATENT OFFICE.

E. L. PRATT, OF PHILADELPHIA, PENNSYLVANIA, ASSIGNOR TO HIMSELF AND R. B. FITTS, OF SAME PLACE.

MEAT-SAFE.

Specification of Letters Patent No. 25,165, dated August 16, 1859.

*To all whom it may concern:*

Be it known that I, E. L. PRATT, of the city of Philadelphia, in the State of Pennsylvania, have invented a new and Improved Apparatus for Preserving and Protecting Fresh Meat and other Similar Articles of Food; and I do hereby declare that the following is a full, clear, and exact description of the construction and operation of the same, reference being had to the annexed drawings, making a part of this specification, in which—

Figure 1 is a vertical, and Fig. 2 a horizontal section (on the line $y$ of Fig. 1) of the same—like letters in both figures indicating the same parts.

My invention has for its object the exposure of fresh meat, and other similar articles of food, to a free circulation of cool, fresh air, while it is at the same time perfectly protected from exposure to the unfavorable influences of light and heat, and from the depredations of animals, vermin or insects.

It consists in the combined arrangement, as hereinafter described, of a close cover, perforated with numerous small holes at or near its upper part; and a stand or horizontal platform, likewise perforated with numerous small holes and supported at a short distance above the ground or floor (of a cellar, spring house, pantry, or other suitable apartment for storing food) in such a manner as to subject the contents of the same to a free circulation of the lowest and coolest portion of the air of the said apartment.

The drawings represent a portable form of my improved apparatus—A, being the cover; and B, the stand or platform. The cover (A) is open below and, in this instance, is provided with a communicating tube $c$, above, which serves for a handle, the same being covered at its upper end with a disk $d$, perforated with numerous small holes, or with fine wire-gauze, so as to preclude the entrance of the smallest insects, and yet allow the passage of air or gases freely through the same. The stand or platform (B) is, in this instance, constructed of tinned plate, and has a raised edge $e$, for keeping the cover (A) in place thereon. It is also provided with a circular series of large holes, each covered with a raised disk $f$, perforated with numerous small holes so as to preclude the entrance of the smallest insects and at the same time allow external air to pass upward freely through them—the said platform being provided with legs $g$—$g$, so as to support it clear of the floor or ground. The disks ($f$) are arranged, in this instance, in a circular series, for the purpose of leaving a level central-part, $h$, upon which to set a plate or cup containing the article to be preserved; but, it is also provided with a removable trivet $i$, consisting of a grating or wire net-work supported by legs, at a short distance above the perforations so that fresh meat, and such other articles, may be laid directly thereon and thus exposed on both sides, to the fresh air—in which case the whole area of the platform may, very properly, be perforated, or even composed of fine wire gauze. Hooks $k$—$k$, may be attached above, to serve the same purpose as the trivet, in exposing all sides of meat to the air. I wish it to be distinctly understood that I do not propose to confine this combined cover and stand to the material, form or construction just specified, but to use any suitable material, and construct it of any form or dimensions that either a portable or stationary requirement may render proper—provided the principle is preserved of a cover perforated above, in combination with a perforated supporting platform raised sufficiently from the floor or ground of the apartment containing it to allow the cool, fresh air to pass upward through it, substantially as described.

The influence of light, heat and confined air in hastening the decomposition of fresh meat, and other similar articles of food, is well known; and it is also well known that the nearer to the floor or bottom of a cellar, spring house, or pantry the cooler will the air be found. Consequently it will be perceived that the present invention is admirably adapted to the purpose for which it is proposed—being proof against the entrance of vermin or insects, adapted for the thorough exposure of its contents to a free circulation of fresh, cool air, and at the same time precluding the entrance of light.

Having received a patent, dated the 29th day of March, 1859, for an improved milk-vessel—consisting of a pan and cover so constructed and combined together as to take in air at its sides and discharge it at its top—I therefore do not herein claim such an apparatus; but Having fully described and pointed out the peculiarities of the present invention, what I claim therein as new of my invention, and desire to secure by Letters Patent is, A new article of manufacture, being a combined arrangement of a cover, A, perforated with small holes at the upper part, d, and a stand, B, also perforated with small holes, f, substantially as and for the purpose specified.

E. L. PRATT.

Witnesses:
 BENJ. MORRISON,
 R. F. SHATTUCK.